(12) United States Patent
Lee et al.

(10) Patent No.: US 12,221,498 B2
(45) Date of Patent: Feb. 11, 2025

(54) POLYOLEFIN

(71) Applicant: LG Chem, Ltd., Seoul (KR)

(72) Inventors: Jinyoung Lee, Daejeon (KR); Sung Min Lee, Daejeon (KR); Jeongkyu Lee, Daejeon (KR); Hyojoon Lee, Daejeon (KR); Seyoung Kim, Daejeon (KR); Sung Ho Park, Daejeon (KR); Seul Ki Im, Daejeon (KR); Seok Hwan Kim, Daejeon (KR); Daesik Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 871 days.

(21) Appl. No.: 17/282,524

(22) PCT Filed: Dec. 20, 2019

(86) PCT No.: PCT/KR2019/018226
§ 371 (c)(1),
(2) Date: Apr. 2, 2021

(87) PCT Pub. No.: WO2020/130720
PCT Pub. Date: Jun. 25, 2020

(65) Prior Publication Data
US 2021/0395411 A1 Dec. 23, 2021

(30) Foreign Application Priority Data

Dec. 21, 2018 (KR) .................. 10-2018-0167766
Jan. 28, 2019 (KR) .................. 10-2019-0010606

(51) Int. Cl.
*C08F 210/16* (2006.01)
*C08F 210/18* (2006.01)

(52) U.S. Cl.
CPC .......... *C08F 210/16* (2013.01); *C08F 210/18* (2013.01); *C08F 2420/10* (2021.01)

(58) Field of Classification Search
CPC ... C08F 210/16; C08F 2420/10; C08F 210/18
See application file for complete search history.

(56) References Cited

U.S. PATENT DOCUMENTS

| | | | |
|---|---|---|---|
| 5,378,764 A * | 1/1995 | Benham ................. | C08L 23/06 525/240 |
| 5,798,427 A | 8/1998 | Foster et al. | |

(Continued)

FOREIGN PATENT DOCUMENTS

| | | |
|---|---|---|
| CN | 101857692 A | 10/2010 |
| CN | 105008408 A | 10/2015 |

(Continued)

OTHER PUBLICATIONS

Extended European Search Report including Written Opinion for Application No. 19897995.7 dated Nov. 12, 2021, pp. 1-9.

(Continued)

*Primary Examiner* — Ling Siu Choi
*Assistant Examiner* — David L Miller
(74) *Attorney, Agent, or Firm* — Lerner David LLP

(57) ABSTRACT

The present invention relates to polyolefin. More specifically, the present invention relates to polyolefin having excellent dart drop impact strength, and exhibiting improved transparency, and such polyolefin has a density of 0.915 g/cm³ to 0.930 g/cm³ measured according to ASTM D1505; and has an ethylene sequence inhomogeneity (I) calculated by the following Equation 1 of 1.25 to 1.40, when analyzed by SSA (Successive Self-nucleation and Annealing):

$$\text{Inhomogeneity } (I) = L_w/L_n \quad \text{[Equation 1]}$$

in the Equation 1,
$L_w$ is weighted average (unit: nm) of ESL (Ethylene sequence length), and $L_n$ is arithmetic mean (unit: nm) of ESL (Ethylene sequence length).

10 Claims, 1 Drawing Sheet

(56) References Cited

U.S. PATENT DOCUMENTS

| | | | |
|---|---|---|---|
| 8,722,804 | B2 | 5/2014 | Lue et al. |
| 8,962,755 | B2 | 2/2015 | Wang et al. |
| 9,079,991 | B2 | 7/2015 | Ker et al. |
| 9,127,106 | B2 | 9/2015 | Hoang et al. |
| 9,334,348 | B2 | 5/2016 | Berbee et al. |
| 10,676,552 | B2 | 6/2020 | Lam et al. |
| 11,339,278 | B2 | 5/2022 | Wang et al. |
| 11,359,081 | B2 | 6/2022 | Wang et al. |
| 11,542,351 | B2 | 1/2023 | Lee et al. |
| 11,680,160 | B2 | 6/2023 | Lee et al. |
| 11,987,655 | B2 * | 5/2024 | Lee ............... C08F 210/16 |
| 2013/0296497 | A1 | 11/2013 | Jeong et al. |
| 2015/0353659 | A1 | 12/2015 | Atiqullah et al. |
| 2016/0289365 | A1 | 10/2016 | Jeon et al. |
| 2018/0305532 | A1 | 10/2018 | Zhang et al. |
| 2019/0127501 | A1 | 5/2019 | Wang et al. |
| 2019/0135963 | A1 | 5/2019 | Kim et al. |
| 2019/0161590 | A1 | 5/2019 | Kwon et al. |
| 2019/0225721 | A1 | 7/2019 | Cho et al. |
| 2019/0263942 | A1 | 8/2019 | Jeong et al. |
| 2019/0284317 | A1 | 9/2019 | Kwon et al. |
| 2020/0010589 | A1 | 1/2020 | Lee et al. |
| 2021/0002463 | A1 * | 1/2021 | Jeon ............... C08F 210/16 |
| 2021/0371558 | A1 | 12/2021 | Lee et al. |
| 2021/0395411 | A1 | 12/2021 | Lee et al. |

FOREIGN PATENT DOCUMENTS

| | | | |
|---|---|---|---|
| CN | 107312229 | A | 11/2017 |
| CN | 108299709 | A | 7/2018 |
| EP | 0735060 | A2 | 10/1996 |
| EP | 0743324 | A2 | 11/1996 |
| EP | 1217013 | A2 * | 6/2002 ............... C08F 10/00 |
| EP | 2966096 | A1 | 1/2016 |
| EP | 3812406 | A1 | 4/2021 |
| EP | 3854823 | A1 | 7/2021 |
| EP | 3854824 | A1 | 7/2021 |
| JP | 2018178101 | A | 11/2018 |
| KR | 20100102854 | A | 9/2010 |
| KR | 20120087101 | A | 8/2012 |
| KR | 101725004 | B1 | 4/2017 |
| KR | 20170105789 | A | 9/2017 |
| KR | 20180033008 | A | 4/2018 |
| KR | 20180067945 | A | 6/2018 |
| KR | 20180071853 | A | 6/2018 |
| KR | 20180071854 | A | 6/2018 |
| KR | 20180073419 | A | 7/2018 |
| KR | 20180075317 | A | 7/2018 |
| KR | 20180087868 | A | 8/2018 |
| KR | 20180099269 | A | 9/2018 |
| KR | 20180103349 | A | 9/2018 |
| WO | 0204556 | A2 | 1/2002 |
| WO | 2010034520 | A1 | 4/2010 |
| WO | 2011129956 | A1 | 10/2011 |
| WO | 2013078224 | A1 | 5/2013 |
| WO | 2017181424 | A1 | 10/2017 |
| WO | 2018193331 | A1 | 10/2018 |
| WO | 2018193375 | A1 | 10/2018 |
| WO | WO-2019117443 | A1 * | 6/2019 ............... C08F 2/38 |

OTHER PUBLICATIONS

Extended European Search Report including Written Opinion for Application No. 19898360.3 dated Nov. 19, 2021, pp. 1-9.

Arnal, et al., Applications of Successive Self-nucleation and Annealing (SSA) to Polymer Characterization, Journal of Thermal Analysis and Calorimetry, Jan. 25, 2000, pp. 451-470, vol. 59.

C.J. Perez, et al., "Early Detection of Degradation in a Semi-Crystalline Polyolefin by a Successive Self-Nucleation and Annealing Technique", Polymer Degradation and Stability, Available Online Apr. 14, 2007, pp. 1213-1218, vol. 92, Issue 7.

Guanghao Shen, et al., "Crystallization and Fracture Behaviors of High-Density Polyethylene/Linear Low-Density Polyethylene Blends: the Influence of Short-Chain Branching", Journal of Applied Polymer Science, Published Online Jan. 7, 2013, pp. 2103-2111.

International Search Report for Application No. PCT/KR2019/018224, mailed Apr. 17, 2020, pp. 1-2.

International Search Report for Application No. PCT/KR2019/018225, dated Apr. 17, 2020, 2 pages.

International Search Report for application No. PCT/KR2019/018226 dated Apr. 21, 2020.

Meng, et al., The Effect of Comonomer Type and Content on the Properties of Ziegler-Natta Bimodal High-Density Polyethylene, Journal of the Korean Chemical Society, Aug. 2011, pp. 673-679, vol. 55, No. 4.

Czaja K., et al., "Studies of Intermolecular Heterogeneity Distribution in Ethylene/1-hexene Copolymers Using DSC Method", Journal of Thermal analysis and Calorimetry, Mar. 2002, pp. 547-554, vol. 67, Kluwer Academic Publishers. XP019254071.

Extended European Search Report including Written Opinion for Application No. 19898473.4 dated Jul. 27, 2021, pp. 1-8.

Shanks, R.A., et al., "Crystallisation of blends of LLDPE with branched VLDPE", Polymer, Sep. 1999, pp. 4579-4587, vol. 41, Elsevier Science Ltd. XP004189981.

Kong, J et al., "Study on Molecular Chain Heterogeneity of Linear Low-Density Polyethylene by Cross-Fractionation of Temperature Rising Elution Fractionation and Successive Self-Nucleation/Annealing Thermal Fractionation", "Journal of Applied Polymer Science", May 2004, pp. 1710-1718, vol. 94.

* cited by examiner

POLYOLEFIN

CROSS-REFERENCE TO RELATED APPLICATION(S)

This application is a national phase entry under 35 U.S.C. § 371 of International Application No. PCT/KR2019/018226 filed Dec. 20, 2019, which claims priority from Korean Patent Application No. 10-2018-0167766 filed Dec. 21, 2018, and Korean Patent Application No. 10-2019-0010606 filed Jan. 28, 2019, all of which are incorporated herein by reference.

BACKGROUND OF THE INVENTION

(a) Field of the Invention

The present invention relates to polyolefin. More specifically, the present invention relates to polyolefin that has improved mechanical properties such as excellent dart drop impact strength, and may exhibit improved transparency when preparing a film.

(b) Description of the Related Art

Linear low density polyethylene (LLDPE) is prepared by copolymerization of ethylene and alpha olefin at low pressure using a polymerization catalyst, and it has narrow molecular weight distribution and short chain branches of a certain length, and does not have long chain branches. A linear low density polyethylene film has high elongation and breaking strength, and excellent tear strength and dart drop impact strength, as well as general properties of polyethylene, and thus, the use is increasing in stretch films, overlap films, and the like, for which the existing low density polyethylene or high density polyethylene cannot be applied.

However, linear low density polyethylene has poor blown film processability and low transparency, compared to excellent mechanical properties. A blown film is a film prepared by blowing air in molten plastic to inflate, and it is also referred to as an inflation film.

Meanwhile, as the density of linear low density polyethylene is lower, dart drop impact strength increases. However, if a lot of comonomers are used to prepare low density polyethylene, fouling may be frequently generated in a slurry polymerization process.

Meanwhile, processability may be improved by introducing LCB (long chain branch) in linear low density polyethylene, but transparency and dart drop impact strength are deteriorated as LCB increases.

Thus, there is a demand for the development of polyethylene that has low density and can realize excellent mechanical properties such as dart drop impact strength as well as transparency.

PRIOR ART (Patent Document 1) Korean Laid-Open Patent Publication No. 2010-0102854

SUMMARY OF THE INVENTION

In order to solve the problem of the prior art, it is an object of the present invention to provide polyolefin that has low density and improved mechanical properties such as excellent dart drop impact strength, and may exhibit improved transparency when preparing a film.

In order to achieve the object, the present invention provides polyolefin having density of 0.915 g/cm$^3$ to 0.930 g/cm$^3$; and ethylene sequence inhomogeneity (I) calculated by the following Equation 1 of 1.25 to 1.40, when analyzed by SSA (Successive Self-nucleation and Annealing):

$$\text{Inhomogeneity } (I) = L_w/L_n \quad \text{[Equation 1]}$$

In the Equation 1, $L_w$ is the weighted average (unit: nm) of ESL (Ethylene sequence length), and $L_n$ is the arithmetic mean (unit: nm) of ESL (Ethylene sequence length).

According to the present invention, during the polymerization of polyolefin using a metallocene catalyst, the length and distribution of ethylene sequence forming lamella can be appropriately controlled, thus providing polyolefin having optimum ethylene sequence inhomogeneity.

Thereby, polyolefin having excellent transparency and high dart drop impact strength can be provided.

DETAILED DESCRIPTION OF THE EMBODIMENTS

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, polyolefin according to the present invention will be explained in detail.

Polyolefin according to one embodiment of the present invention is characterized in that density is 0.915 g/cm$^3$ to 0.930 g/cm$^3$; and ethylene sequence inhomogeneity (I) calculated by the following Equation 1 is 1.25 to 1.40, when analyzed by SSA (Successive Self-nucleation and Annealing):

$$\text{Inhomogeneity } (I) = L_w/L_n \quad \text{[Equation 1]}$$

In the Equation 1, $L_w$ is the weighted average (unit: nm) of ESL (Ethylene sequence length), and $L_n$ is the arithmetic mean (unit: nm) of ESL (Ethylene sequence length).

Linear low density polyethylene (LLDPE) is prepared by copolymerization of ethylene and alpha olefin at low pressure using a polymerization catalyst, and has narrow molecular weight distribution, and short chain branch of a certain length. A linear low density polyethylene film has high breaking strength and elongation, excellent tear strength and dart drop impact strength, as well as general properties of polyethylene, and thus, the use is increasing in stretch films, overlap films, and the like, for which the existing low density polyethylene or high density polyethylene cannot be applied.

Meanwhile, it is known that as the density of linear low density polyethylene is lower, transparency and dart drop impact strength increases. However, if a lot of comonomers are used to prepare low density polyethylene, fouling may be frequently generated in a slurry polymerization process, and when preparing a film comprising the same, the amount of an antiblocking agent used should be increased due to stickiness. And, the production process may be unstable, or the morphology of produced polyethylene may be deteriorated, thus decreasing bulk density.

Thus, the present invention provides polyolefin that not only has low density, but also has optimum ASL (Average Ethylene Sequence Length) rate capable of increasing transparency and dart drop impact strength, by appropriately controlling the length and distribution of ethylene sequence forming lamella.

Specifically, polyolefin according to one embodiment of the invention has density of 0.915 g/cm³ or more and 0.930 g/cm³ or less. Namely, it may be low density polyolefin having density of 0.930 g/cm³ or less.

According to one embodiment of the invention, the polyolefin may be, for example, copolymer of ethylene and alpha olefin. Wherein, the alpha olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbordene, phenyl norbordene, vinyl norbordene, dicyclopentadiene, 1,4-butadiene, 1,5-pentadiene, 1,6-hexadiene, styrene, alpha-methyl styrene, divinylbenzene, and 3-chloromethyl styrene. Among them, the polyolefin may be copolymer of ethylene and 1-butene, copolymer of ethylene and 1-hexene, or copolymer of ethylene and 1-octene.

More specifically, according to one embodiment, the density of polyolefin may be 0.915 g/cm³ or more, or 0.916 g/cm³ or more, or 0.917 g/cm³ or more, or 0.918 g/cm³ or more, or, or 0.919 g/cm³ or more, and 0.930 g/cm³ or less, or 0.928 g/cm³ or less, or 0.925 g/cm³ or less, or 0.922 g/cm³ or less, or 0.921 g/cm³ or less, or 0.920 g/cm³ or less. Wherein the density is a value measured according to ASTM D1505.

According to one embodiment of the invention, the polyolefin is characterized in that ethylene sequence inhomogeneity (I) calculated by the following Equation 1 is 1.25 to 1.40, when analyzed by SSA (Successive Self-nucleation and Annealing).

$$\text{Inhomogeneity } (I) = L_w/L_n \quad \text{[Equation 1]}$$

In the Equation 1, $L_w$ is the weighted average (unit: nm) of ESL (Ethylene sequence length), and $L_n$ is the arithmetic mean (unit: nm) of ESL (Ethylene sequence length).

The polyolefin of the present invention is semi-crystalline polymer, and may include a crystalline part and an amorphous part. Specifically, polymer chains comprising ethylene repeat units are folded to make a bundle, thereby forming a crystalline block (or segment) in the form of lamella. The ethylene repeat unit forming the lamellar crystal is ethylene sequence.

The present invention is based on the discovery that when the ethylene sequence inhomogeneity (I) calculated by the Equation 1 is 1.25 to 1.40 when analyzed by SSA (Successive Self-nucleation and Annealing), the polyolefin may have improved transparency and dart drop impact strength, compared to the existing polyolefin having the same density.

SSA (Successive Self-nucleation and Annealing) is a method of quenching every time each stage ends while decreasing temperature by stages using Differential Scanning calorimeter (DSC), thereby preserving crystals crystallized at the corresponding temperature every stage.

Specifically, if polyolefin is heated to completely molten, and then, cooled to a specific temperature (T) and gradually annealed, lamellae unstable at the corresponding temperature (T) are still molten and only stable lamellae are crystallized. Wherein, the stability to the corresponding temperature (T) depends on the thickness of lamella, and the thickness of lamella depends on the structure of chain. Thus, by progressing heat treatment by stages, the thickness and distribution degree of lamellae according to the structure of polymer chain can be measured quantitatively, and thus, distribution of each melting peak area can be measured.

According to one embodiment of the invention, SSA may be conducted by heating the polyolefin to the first heating temperature of 120 to 124° C. using DSC, maintaining for 15 to 30 minutes, and then, cooling to 28 to 32° C., and while decreasing heating temperature by stages with (n+1)th heating temperature being 3 to 7° C. lower than nth heating temperature, repeating heating-annealing-quenching until the final heating temperature becomes 50 to 54° C.

More specifically, SSA may be conducted by the following steps i) to v):

i) heating polyolefin to 160° C. using DSC, and then, maintaining for 30 minutes to remove all the heat history before measurement;

ii) decreasing temperature from 160° C. to 122° C., and then, maintaining for 20 minutes, decreasing temperature to 30° C., and maintaining for 1 minute;

iii) heating to 117° C., which is 5° C. lower than 122° C., and then, maintaining for 20 minutes, decreasing temperature to 30° C., and maintaining for 1 minute;

iv) while gradually decreasing the heating temperature at the identical temperature rise speed, maintenance time and cooling temperature, with (n+1)th heating temperature being 5° C. lower than nth heating temperature, repeating until the heating temperature becomes 52° C.; and v) finally, increasing the temperature from 30° C. to 160° C.

Figure 2:
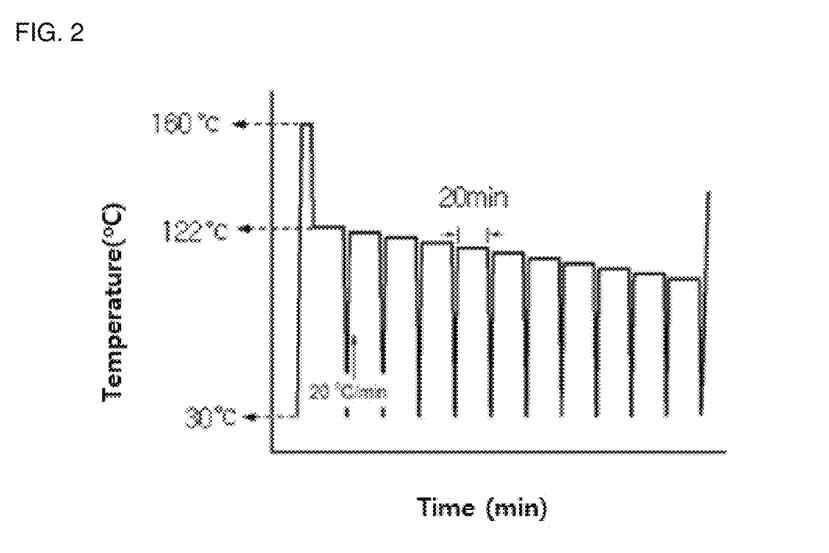
FIG. 2 shows the temperature profile of SSA analysis according to one embodiment of the invention.

The temperature profile of SSA analysis according to one embodiment of the invention is shown in FIG. 2.

Referring to FIG. 2, polyolefin is first heated to 160° C. using differential scanning calorimeter (device name: DSC8000, manufacturing company: PerkinElmer), and then, maintained for 30 minutes to remove all the heat history before measuring the sample. The temperature is decreased from 160° C. to 122° C., and then, maintained for 20 minutes, and decreased to 30° C. and maintained for 1 minute, and then, increased again.

Next, after heating to a temperature (117° C.) 5° C. lower than the first heating temperature of 122° C., the temperature is maintained for 20 minutes, decreased to 30° C. and maintained for 1 minute, and then, increased again. In this way, while gradually decreasing the heating temperature at the identical maintenance time and cooling temperature, with (n+1)th heating temperature being 5° C. lower than nth heating temperature, the process is repeated till 52° C. Wherein, the temperature increase speed and decrease speed are respectively controlled to 20° C./min. Finally, in order to quantitatively analyzing the distribution of crystals formed with repeated heating-annealing-quenching, while raising the temperature from 30° C. to 160° C. at the temperature rise speed of 10° C./min, calory change is observed to measure thermogram.

As such, if heating-annealing-quenching of the polyolefin of the present invention are repeated by SSA method, and then, the temperature is increased, peaks appear according to temperature, and thus, ethylene sequence of different thicknesses are obtained, and therefrom, weighted average ($L_w$) and arithmetic mean ($L_n$) of ethylene sequence can be calculated by the following Equations 2 and 3:

$$L_n = \frac{S_1 L_1^2 + S_2 L_2^2 + S_3 L_3^2 + \ldots + S_i L_i^2}{S_1 + S_2 + S_3 + \ldots + S_i} = \sum f_i L_i \quad \text{[Equation 2]}$$

$$L_w = \frac{S_1 L_1^2 + S_2 L_2^2 + S_3 L_3^2 + \ldots + S_i L_i^2}{S_1 L_1 + S_2 L_2 + S_3 L_3 + \ldots + S_i L_i} = \frac{\sum f_i L_i^2}{\sum f_i L_i} \quad \text{[Equation 3]}$$

In the Equations 2 and 3, $S_i$ is the area of each melting peak measured in SSA thermogram, and $L_i$ is ASL (Average Ethylene Sequence Length) corresponding to each melting peak in SSA thermogram.

Wherein, the ASL can be calculated from SSA thermogram, referring to Journal of Polymer Science Part B: Polymer Physics. 2002, vol. 40, 813-821, and Journal of the Korean Chemical Society 2011, Vol. 55, No. 4.

The rate of $L_w$ and $L_n$ ($L_w/L_n$) calculated by the above method is inhomogeneity (I) of ethylene sequence, and the larger I value means that lamellae are non-uniformly distributed in the polymer chain, and SCB are include in high content.

The polyolefin according to one embodiment of the invention may have the inhomogeneity (I) of 1.25 or more, or 1.26 or more, or 1.27 or more, and 1.40 or less, or 1.38 or less, or 1.35 or less, or 1.32 or less.

As inhomogeneity is higher, dart drop impact strength is more excellent, and thus, since the polyolefin of the present invention has the above range of inhomogeneity, it may exhibit improved transparency and dart drop impact strength compared to the existing polyolefin having the same range of density.

Although low density polyolefin can improve dart drop impact strength, melt strength is deteriorated, thus rendering it difficult to prepare a stable blow film. However, the polyolefin of the present invention can realize improved dart drop impact strength, compared to the existing polyolefin products having the same density.

And, the polyolefin according to one embodiment of the invention may have melt index ($MI_{2.16}$) measured under temperature of 190° C. and load of 2.16 kg according to ASTM D1238 of 0.5 to 1.5 g/10 min, while fulfilling the above explained properties. More specifically, the melt index ($MI_{2.16}$) may be 0.5 g/10 min or more, or 0.7 g/10 min or more, or 0.8 g/10 min or more, or 0.9 g/10 min or more, and 1.5 g/10 min or less, or 1.4 g/10 min or less, or 1.3 g/10 min or less.

And, the polyolefin according to one embodiment of the invention may have haze of a polyolefin film (BUR 2.3, film thickness of 55 to 65 μm) prepared using a film applicator, measured according to ISO 13468, of 11% or less. More specifically, the haze of the polyolefin according to one embodiment of the invention may be 11% or less, or 10.5% or less, or 10% or less. As the haze value is lower, it is more excellent, and thus, the lower limit is not specifically limited, but for example, it may be 4% or more, or 5% or more, or 6% or more, or 7% or more.

And, the polyolefin according to one embodiment of the invention may have dart drop impact strength of 850 g or more, or 900 g or more, or 950 g or more, measured according to ASTM D 1709 [Method A], after preparing a polyolefin film (BUR 2.3, film thickness of 55 to 65 μm) using a film applicator. As the dart drop impact strength is higher, it is more excellent, and thus, the upper limit is not specifically limited, but for example, it may be 1,500 g or less, or 1,400 g or less, or 1,300 g or less, or 1,200 g or less.

And, the polyolefin according to one embodiment of the invention may have weight average molecular weight (Mw) of 70,000 to 140,000 g/mol. More preferably, the weight average molecular weight may be 80,000 g/mol or more, or 90,000 g/mol or more, and 130,000 g/mol or less, or 120,000 g/mol or less.

The weight average molecular weight (Mw) is measured using gel permeation chromatography (GPC), and it means universal calibration value using a polystyrene standard, and may be appropriately controlled considering the use or application field of the polyolefin.

Meanwhile, the polyolefin according to one embodiment of the invention having the above described properties may be prepared by a method comprising a step of polymerizing olefin monomers in the presence of a hybrid supported metallocene compound as the catalytically active component.

More specifically, the polyolefin of the present invention, although not limited thereto, may be prepared by polymerizing olefin monomers in the presence of a hybrid supported metallocene catalyst comprising one or more first metallocene compounds selected from compounds represented by the following Chemical Formula 1; one or more second metallocene compounds selected from compounds represented by the following Chemical Formula 2; and a carrier supporting the first and second metallocene compounds.

[Chemical Formula 1]

in the Chemical Formula 1, $Q_1$ and $Q_2$ are identical to or different from each other, and each independently, halogen, a C1-C20 alkyl group, a C2-C20 alkenyl group, a C2-C20 alkoxyalkyl group, a C6-C20 aryl group, a C7-C20 alkylaryl group, or a C7-C20 arylalkyl group;

$T_1$ is carbon, silicon or germanium;

$M_1$ is a Group 4 transition metal;

$X_1$ and $X_2$ are identical to or different from each other, and each independently, halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group;

$R_1$ to $R_{14}$ are identical to or different from each other, and each independently, hydrogen, halogen, a C1-C20 alkyl group, a C1-C20 haloalkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, or two or more neighboring groups of $R_1$ to $R_{14}$ are connected with each other to form a substituted or unsubstituted aliphatic or aromatic ring;

[Chemical Formula 2]

in the Chemical Formula 2, $Q_3$ and $Q_4$ are identical to or different from each other, and each independently, halogen, a C1-C20 alkyl group, a C2-C20 alkenyl group, a C2-C20 alkoxyalkyl group, a C6-C20 aryl group, a C7-C20 alkylaryl group, or a C7-C20 arylalkyl group;

$T_2$ is carbon, silicon or germanium;

$M_2$ is a Group 4 transition metal;

$X_3$ and $X_4$ are identical to or different from each other, and each independently, halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group;

$R_{15}$ to $R_{28}$ are identical to or different from each other, and each independently, hydrogen, halogen, a C1-C20 alkyl group, a C1-C20 haloalkyl group, a C2-C20 alkenyl group, a C2-C20 alkoxyalkyl group, a C1-C20 alkyl- silyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, provided that $R_{20}$ and $R_{24}$ are identical to or different from each other, and each independently, a C1 to C20 alkyl group, or two or more neighboring groups of $R_{15}$ to $R_{28}$ are connected with each other to form a substituted or unsubstituted aliphatic or aromatic ring.

In the hybrid supported metallocene catalyst, the substituents of the Chemical Formulas 1 and 2 will be explained in detail.

The C1 to C20 alkyl group may include a liner or branched alkyl group, and specifically, may include a methyl group, an ethyl group, a propyl group, an isopropyl group, an n-butyl group, a tert-butyl group, a pentyl group, a hexyl group, a heptyl group, an octyl group, and the like, but is not limited thereto.

The C2 to C20 alkenyl group may include a linear or branched alkenyl group, and specifically, may include an allyl group, an ethenyl group, a propenyl group, a butenyl group, a pentenyl group, and the like, but is not limited thereto.

The C6 to C20 aryl group may include a monocyclic or condensed ring aryl group, and specifically, it may include a phenyl group, a biphenyl group, a naphthyl group, a phenanthrenyl group, a fluorenyl group, and the like, but is not limited thereto.

The C1 to C20 alkoxy group may include a methoxy group, an ethoxy group, a phenyloxy group, a cyclohexyloxy group, and the like, but is not limited thereto.

The C2 to C20 alkoxyalkyl group is a functional group wherein one or more hydrogen atoms of the above explained alkyl group are substituted with an alkoxy group, and specifically, it may include an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, and the like; or an aryloxyalkyl group such as a phenoxyhexyl group, and the like, but is not limited thereto.

The C1 to C20 alkylsilyl group or C1 to C20 alkoxysilyl group is a functional group wherein 1 to 3 hydrogen atoms of $-SiH_3$ are substituted with the above explained alkyl group or alkoxy group, and specifically, may include an alkylsilyl group such as a methylsilyl group, a dimethylsilyl group, a trimethylsilyl group, a dimethylethylsilyl group, a diethylmethylsilyl group or a dimethylpropylsilyl group; an alkoxysilyl group such as a methoxysilyl group, a dimethoxysilyl group, a trimethoxy silyl group or a dimethoxyethoxysilyl group, and the like; an alkoxyalkylsilyl group such as a methoxydimethylsilyl group, a diethoxymethylsilyl group, or a dimethoxypropylsilyl group, and the like, but is not limited thereto.

The C1 to C20 silylalkyl is a functional group wherein one or more hydrogen atoms of the above explained alkyl group are substituted with a silyl group, and specifically, may include $-CH_2-SiH_3$, a methylsilylmethyl group, or a dimethylethoxysilylpropyl group, and the like, but is not limited thereto.

The halogen may be fluorine (F), chlorine (Cl), bromine (Br), or iodine (I).

The sulfonate group has a structure of $-O-SO_2-R'$ wherein R' may be a C1-C20 alkyl group. Specifically, the C1 to C20 sulfonate group may include a methanesulfonate group or a phenylsulfonate group, and the like, but is not limited thereto.

And, as used herein, the description "two neighboring substituents are connected with each other to form an aliphatic or aromatic ring" means that atom(s) of two substituents and atom(s) to which the two substituents bond are connected with each other to form a ring. Specifically, as the examples of the case wherein $R_a$ and $R_b$ or $R_{a'}$ and $R_{b'}$ of $-NR_aR_b$ or $-NR_aR_{b'}$ are connected with each other to form an aliphatic ring, a piperidinyl group, and the like may be mentioned, and as the example of the case wherein $R_a$ and $R_b$ or $R_{a'}$ and $R_{b'}$ of $-NR_aR_b$ or $-NR_aR_{b'}$ are connected with each other to form an aromatic ring, a pyrrolyl group, and the like may be mentioned.

The above explained substituents may be optionally substituted with one or more substituents selected from the group consisting of a hydroxyl group; halogen; an alkyl group or an alkenyl group, an aryl group, an alkoxy group; an alkyl group or an alkenyl group, an aryl group, an alkoxy group including one or more hetero atoms of Group 14 to Group 16; a silyl group; an alkylsilyl group or an alkoxysilyl group; a phosphine group; a phosphide group; a sulfonate group; and a sulfone group.

As the Group 4 transition metal, titanium (Ti), zirconium (Zr), hafnium (Hf), and the like may be mentioned, but is not limited thereto.

Using the hybrid supported catalyst, excellent dart drop impact strength may be secured by inhomogeneity of lamellar distribution while maintaining transparency of polyolefin, and thus, polyolefin having high processability, particularly excellent melt blown processability may be prepared.

Specifically, in the hybrid supported catalyst according to one embodiment of the invention, the first metallocene compound comprises long chain branches and is easy to prepare low molecular weight polyolefin, and the second metallocene compound comprises a small amount of long chain branches compared to the first metallocene compound and is easy to prepare relatively high molecular weight polyolefin. Particularly, when polymer comprises a lot of long chain branches and has large molecular weight, the melt strength increases, but the first metallocene compound comprises a lot of long chain branches but has low molecular weight, there is a limit in improving bubble stability.

In the present invention, a first metallocene compound comprising relatively many long chain branches and producing low molecular weight polymer, and a second metallocene compound comprising relatively many short chain branches and producing high molecular weight polymer are supported together, thereby maintaining excellent transparency and improving melt strength. By supporting the two kinds of metallocene compounds together, long chain branches existing in the polymer are positioned relatively toward low molecular weight, and thus, transparency is not deteriorated.

Particularly, the hybrid supported catalyst of the present invention is characterized in that long chain branches produced by the first metallocene compound of the Chemical Formula 1 and long chain branches produced by the second metallocene compound of the Chemical Formula 2 are entangled with each other in a molecular level. Due to the entanglement between long chain branches, a large force is required to release a molten state. Seeing that melt strength is not improved when melt blending homopolymers produced by each catalyst, improvement in melt strength is effective when entanglement occurs from the polymerization step by the hybrid supported catalyst.

More specifically, in the hybrid supported catalyst according to one embodiment of the invention, the first metallocene compound represented by the Chemical Formula 1 comprises a cyclopentadienyl ligand and a tetrahydroindenyl ligand, wherein the ligands are cross-linked by $-Si(Q_1)(Q_2)-$, and $M_1(X_1)(X_2)$ exists between the ligands. By polymerizing with the catalyst having such a structure, polymer comprising a small amount of long chain branches, and relatively narrow molecular weight distribution (PDI, MWD, Mw/Mn) and melt flow rate ratio (MFRR) may be obtained.

Specifically, in the structure of the metallocene compound represented by the Chemical Formula 1, the cyclopentadienyl ligand may have an influence on olefin polymerization activity, for example.

Particularly, in case $R_{11}$ to $R_{14}$ of the cyclopentadineyl ligand are each independently, a C1 to C20 alkyl group, a C1 to C20 alkoxy group, or a C2 to C20 alkenyl group, a catalyst obtained from the metallocene compound of the Chemical Formula 1 may exhibit higher activity during an olefin polymerization process, and in case $R_{11}$ to $R_{14}$ are each independently, a methyl group, an ethyl group, a propyl group, or a butyl group, the hybrid supported catalyst may exhibit higher activity during the polymerization process of olefin monomers.

And, the metallocene compound represented by the Chemical Formula 1 has unshared electron pairs capable of acting as Lewis base to the tetrahydroindenyl ligand, thereby exhibiting stable and high polymerization activity, and the tetrahydroindenyl ligand may control the degree of steric hindrance effect according to the kind of substituted functional groups, thus easily controlling the molecular weight of prepared polyolefin.

Specifically, in the Chemical Formula 1, $R_1$ may be hydrogen, a C1 to C20 alkyl group, a C1 to C20 alkoxy group, or a C2 to C20 alkenyl group. More specifically, in the Chemical Formula 1, $R_1$ may be hydrogen or a C1 to C20 alkyl group, and $R_2$ to $R_{10}$ may be each independently, hydrogen. In this case, the hybrid supported catalyst may provide polyolefin having excellent processability.

And, in the structure of the metallocene compound represented by the Chemical Formula 1, the cyclopentadienyl ligand and tetrahydroindenyl ligand are cross-linked by $-Si(Q_1)(Q_2)-$, thus exhibiting excellent stability. In order to secure the effect more effectively, $Q_1$ and $Q_2$ may be each independently, a C1 to C20 alkyl group, or a C6 to C20 aryl group. More specifically, a metallocene compound wherein $Q_1$ and $Q_2$ are each independently, a methyl group, an ethyl group, an n-propyl group, an iso-propyl group, an n-butyl group, a t-butyl group, a phenyl group, or a benzyl group, may be used.

In the structure of the metallocene compound represented by the Chemical Formula 1, $M_1(X_1)(X_2)$ existing between the cyclopentadienyl ligand and tetrahydroindenyl ligand may have an influence on the storage stability of metal complex. In order secure the effect more effectively, $X_1$ and $X_2$ may be each independently, halogen, a C1 to C20 alkyl group, or a C1 to C20 alkoxy group. More specifically, $X_1$ and $X_2$ may be each independently, F, Cl, Br or I, and $M_1$ may be Ti, Zr or Hf; Zr or Hf; or Zr.

For example, as the first metallocene compound capable of providing polyolefin exhibiting more improved dart drop impact strength and high short chain branch content and having excellent blown film processability, compounds represented by the following structural formulas may be mentioned, but not it is limited thereto.

The first metallocene compound represented by the Chemical Formula 1 may be synthesized applying known reactions. Specifically, it may be prepared by connecting between tetrahydroindenyl derivative and cyclopentadiene derivative by a bridge compound to prepare a ligand compound, and then, introducing a metal precursor compound to conduct metallation, but the method is not limited thereto, and for more detailed synthesis method, examples may be referred to.

Meanwhile, in the hybrid supported catalyst according to one embodiment of the invention, the metallocene compound represented by the Chemical Formula 2 has different ligands of a cyclopentadienyl ligand and an indenyl ligand having substituents ($R_{20}$ and $R_{24}$) at specific positions, wherein the different ligands are cross-linked by —Si($Q_3$)($Q_4$)-, and $M_2(X_3)(X_4)$ exists between the different ligands. If the metallocene compound having such a specific structure is activated by an appropriate method and used as a catalyst for olefin polymerization reaction, long chain branches can be produced. As such, by introducing substituents ($R_{20}$ and $R_{24}$) at specific positions of the indene derivative of the Chemical Formula 2, the metallocene compound may have high polymerization activity, compared to metallocene compounds comprising unsubstituted indene compound or indene compound substituted at another position.

Particularly, the second metallocene compound represented by the Chemical Formula 2, by homopolymerization, has molecular weight of about 150,000 to 550,000 and has SCB, and thus, when applied for a hybrid catalyst, has narrow molecular weight distribution and improve processability.

Specifically, in the structure of the metallocene compound represented by the Chemical Formula 2, the cyclopentadienyl ligand may have an influence on the olefin polymerization activity.

Particularly, in case $R_{25}$ to $R_{28}$ of the cyclopentadineyl ligand are each independently, hydrogen, a C1 to C20 alkyl group, a C2 to C20 alkoxyalkyl group, or a C6 to C20 aryl group, a catalyst obtained from the metallocene compound of the Chemical Formula 2 may exhibit higher activity during an olefin polymerization process, and in case $R_{25}$ and $R_{28}$ are each independently, hydrogen, a C1 to C20 alkyl group, or a C2 to C20 alkoxyalkyl group, the hybrid supported catalyst may exhibit very high activity during the polymerization process of olefin monomers.

And, in the structure of the metallocene compound represented by the Chemical Formula 2, the indenyl ligand may control the degree of steric hindrance effect according to the kind of substituted functional groups, thus easily controlling the molecular weight of prepared polyolefin.

Specifically, in order to increase molecular weight, it is preferable that a phenyl group is substituted at the 4$^{th}$ position of the indenyl group, $R_{20}$ at the para-position of the phenyl group is a C1 to C20 alkyl group, and $R_{24}$, the substituent at the 6$^{th}$ position of the indenyl group is a C1 to C20 alkyl group. Particularly, $R_{20}$ and $R_{24}$ may be each independently, a C1 to C4 alkyl group, $R_{20}$ may be preferably a methyl group, an ethyl group, an n-propyl group, an iso-propyl group, and the like, and $R_{24}$ may be preferably a t-butyl group. In this case, the hybrid supported catalyst can provide polyolefin having excellent comonomer incorporation.

The remaining substituents of the indenyl group, $R_{15}$ to $R_{19}$ and $R_{21}$ to $R_{23}$ may be each independently, hydrogen, halogen, a C1 to C20 alkyl group, a C1 to C20 haloalkyl group, a C2 to C20 alkenyl group, a C2 to C20 alkoxyalkyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group.

And, in the structure of the metallocene compound represented by the Chemical Formula 2, the cyclopentadienyl ligand and indenyl ligand are cross-linked by —Si($Q_3$)($Q_4$)-, thus exhibiting excellent stability. In order to secure the effect more effectively, $Q_3$ and $Q_4$ may be each independently, a C1 to C20 alkyl group or a C2 to C20 alkoxyalkyl group. More specifically, a metallocene compound wherein $Q_3$ and $Q_4$ are each independently, a methyl group, an ethyl group, an n-propyl group, an iso-propyl group, an n-butyl group, a t-butyl group, a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, or a tert-butoxyhexyl group may be used.

Particularly, in the metallocene compound represented by the Chemical Formula 2, one or more of the substituents of the cyclopentadiene (Cp) or —Si($Q_3$)($Q_4$)-silyl group may be a C2 to C20 alkoxyalkyl group, more preferably, an iso-propoxyethyl group, an iso-propoxyhexyl group, a tert-butoxyethyl group, a tert-butoxyhexyl group, and the like.

The C2 to C20 alkoxyalkyl group may have an influence on the comonomer incorporation of alpha olefin comonomers such as 1-butene or 1-hexene, and in case the alkoxyalkyl group has a short alkyl group chain of C4 or less, comonomer incorporation of alpha olefin comonomers may be lowered while maintaining total polymerization activity, and thus, polyolefin with controlled copolymerization degree can be prepared without deterioration of other properties.

And, in the structure of the metallocene compound represented by the Chemical Formula 2, $M_2(X_3)(X_4)$ existing between the cyclopentadienyl ligand and tetrahydroindenyl ligand may have an influence on storage stability of metal complex. In order to secure the effect more effectively, $X_3$ and $X_4$ may be each independently, halogen, a C1 to C20 alkyl group, or a C1 to C20 alkoxy group. More specifically, $X_3$ and $X_4$ may be each independently, F, Cl, Br or I, and $M_2$ may be Ti, Zr or Hf; Zr or Hf; or, Zr.

Meanwhile, as specific examples of the second metallocene compound represented by the Chemical Formula 2, compounds represented by the following structural formulas may be mentioned, but the present invention is not limited thereto.

-continued

As explained, since the hybrid supported metallocene catalyst of one embodiment comprises the first and second metallocene compounds, it can prepare polyolefin having excellent processability, particularly, excellent dart drop impact strength.

Particularly, the mole ratio of the first metallocene compound and the second metallocene compound may be about 1:1 to 10:1, preferably about 1.2:1 to 7.5:1, more preferably 1.5:1 to 7.0:1, or 1.8:1 to 6.5:1. The mixing mole ratio of the first metallocene compound and the second metallocene compound may be 1:1 or more so as to control molecular weight and the amount of SCB, LCB to fulfill both properties and processability, and it may be 10:1 or less so as to secure processability.

Meanwhile, since the first and second metallocene compounds have the above explained structural characteristics, they can be stably supported in a carrier.

As the carrier, carriers containing hydroxyl groups or siloxane groups on the surface may be used. Specifically, as the carrier, those dried at high temperature to remove moisture on the surface, thus containing highly reactive hydroxyl groups or siloxane groups may be used. More specifically, as the carrier, silica, alumina, magnesia or a mixture thereof may be used, and among them, silica may be more preferable. The carrier may be dried at high temperature, and for example, high temperature dried silica, silica-alumina, or silica-magnesia, and the like may be used, which may commonly comprise oxide, carbonate, sulfate, nitrate components such as $Na_2O$, $K_2CO_3$, $BaSO_4$ and $Mg(NO_3)_2$, and the like.

The drying temperature of the carrier may be preferably about 200 to 800° C., more preferably about 300 to 600° C., and most preferably about 300 to 400° C. If the drying temperature of the carrier is less than about 200° C., surface moisture may react with a cocatalyst, and if it is greater than about 800° C., pores on the surface of the carrier may be combined to decrease surface area, and surface hydroxyl groups may disappear to remain only siloxane groups, and thus, reaction sites with a cocatalyst may decrease.

The amount of hydroxyl groups on the surface of the carrier may be preferably about 0.1 to 10 mmol/g, and more preferably, about 0.5 to 5 mmol/g. The amount of hydroxyl groups on the surface of the carrier may be controlled by the preparation method and conditions or drying conditions of the carrier, for example, temperature, time, vacuum or spray drying, and the like.

If the amount of hydroxy groups is less than about 0.1 mmol/g, reaction sites with a cocatalyst may be few, and if it is greater than about 10 mmol/g, they may be derived from moisture other than hydroxy groups existing on the surface of the carrier particles, which is not preferable.

And, in the hybrid supported metallocene catalyst of one embodiment, a cocatalyst supported together on the carrier so as to activate the metallocene compound is not specifically limited as long as it is an organic metal compound including Group 13 metal and can be used for olefin polymerization in the presence of common metallocene catalyst.

Specifically, the cocatalyst compound may comprise one or more of an aluminum-containing first cocatalyst of the following Chemical Formula 3, and a borate-based second cocatalyst of the following Chemical Formula 4

[Chemical Formula 3]

In the Chemical Formula 3, $R_a$, $R_b$, and $R_c$ are identical to or different from each other, and each independently, hydrogen, halogen, a C1 to C20 hydrocarbyl group, or a C1 to C20 hydrocarbyl group substituted with halogen;

n is an integer of 2 or more;

[Chemical Formula 4]

In the Chemical Formula 4, $T^+$ is +1 valent polyatomic ion, B is boron in +3 oxidation state, G's are each independently, selected from the group consisting of a hydride group, a dialkylamido group, a halide group, an alkoxide group, an aryloxide group, a hydrocarbyl group, a halocarbyl group and a halo-substituted hydrocarbyl group, and G has 20 or less carbon, provided that G is a halide group at one or less position.

The first cocatalyst of the Chemical Formula 3 may be an alkylaluminoxane-based compound in which repeat units bond in linear, circular or network shape, and specific examples of the first cocatalyst may include methylaluminoxane (MAO), ethylalulminoxane, isobutylaluminoxane, or butylaluminoxane, and the like.

And, the second cocatalyst of the Chemical Formula 4 may be a borate-based compound in the form of tri-substituted ammonium salt or dialkyl ammonium salt, or tri-substituted phosphonium salt. As specific examples of the second cocatalyst, a borate-based compounds in the form of tri-substituted ammonium salt, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium)tetrakis-(2,3,4,6-tetrafluorophenyl)borate; a borate-based compound in the form of dialkylammonium salt, such as dioctadecylammonium tetrakis(pentafluorophenyl)borate, ditetradecylammonium tetrakis(pentafluorophenyl)borate and dicyclohexylammonium tetrakis(pentafluorophenyl)borate; and a borate-based compound in the form of trisubstituted phosphonium salt, such as triphenylphosphonium tetrakis(pentafluorophenyl)borate, methyloctadecylphosphonium tetrakis(pentafluorophenyl)borate and tri(2,6-dimethylphenyl) phosphonium tetrakis(pentafl- uorophenyl)borate, may be mentioned.

In the hybrid supported metallocene catalyst of one embodiment, the mass ratio of total transition metal included in the first metallocene compound and the second metallocene compound and the carrier may be 1:10 to 1:1000. When the carrier and the metallocene compounds are included at the above mass ratio, optimum shape may be exhibited.

And, the mass ratio of the cocatalyst compound and the carrier may be 1:1 to 1:100. When the cocatalyst and the carrier are included at the above mass ratio, activity and polymer fine structure may be optimized.

The hybrid supported metallocene catalyst of one embodiment may be used for the polymerization of olefin monomers. And, the hybrid supported metallocene catalyst may be subjected to a contact reaction with olefin monomers and prepared as a pre-polymerized catalyst, and for example, the catalyst may be separately contacted with olefin monomers such as ethylene, propylene, 1-butene, 1-hexene, 1-octene, and the like and prepared as a pre-polymerized catalyst.

Meanwhile, the hybrid supported metallocene catalyst of one embodiment may be prepared by a method comprising steps of supporting a cocatalyst on a carrier; and supporting the first and second metallocene compounds on the carrier where the cocatalyst is supported.

Wherein, the first and second metallocene compounds may be sequentially supported one by one, or two kinds may be supported together. The sequence of supporting is not limited, but the second metallocene catalyst having relatively poor morphology may be supported first to improve the shape of the hybrid supported metallocene catalyst, and thus, after supporting the second metallocene catalyst, the first metallocene catalyst may be sequentially supported.

In the above method, supporting conditions are not specifically limited, and it may be conducted under conditions well known to a person having ordinary knowledge in the art. For example, high temperature supporting and low temperature supporting may be appropriately used, and for example, the supporting temperature may be about −30° C. to 150° C., preferably room temperature (about 25° C.) to about 100° C., more preferably room temperature to about 80° C. The supporting time may be appropriately controlled according to the amount of the metallocene compounds to be supported. The reacted supported catalyst may be used as it is, after filtering or vacuum distilling a reaction solvent to remove, and if necessary, it may be soxhlet filtered with aromatic hydrocarbon such as toluene.

And, the supported catalyst may be prepared under solvent or non-solvent. As the solvent that can be used, aliphatic hydrocarbon solvents such as hexane or pentane, aromatic hydrocarbon solvents such as toluene or benzene, hydrocarbon solvents substituted with chlorine atom such as dichloromethane, ether-based solvents such as diethylether or THF, acetone, ethylacetate, and the like may be mentioned, and hexane, heptanes, toluene or dichloromethane may be preferably used.

Meanwhile, according to another embodiment of the invention, a method for preparing polyolefin comprising a step of polymerizing olefin monomers in the presence of the hybrid supported metallocene catalyst is provided.

And, the olefin monomers may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosens, norbornene, norbornadiene, ethylidene norbordene, phenyl norbordene, vinyl norbordene, dicylcopentadiene, 1,4-butadiene, 1,5-pentadiene, 1,6-hexadiene, styrene, alpha-methylstyrene, divinylbenzene and 3-chloromethyl styrene.

For the polymerization reaction of olefin monomers, various polymerization processes known as the polymerization reaction of olefin monomers, such as continuous solution polymerization, bulk polymerization, suspension polymerization, slurry polymerization or emulsion polymerization, and the like, may be used. The polymerization reaction may be conducted at a temperature of about 25 to 500° C., or about 25 to 200° C., or about 50 to 150° C., under pressure of about 1 to 100 bar or about 10 to 80 bar.

And, in the polymerization reaction, the hybrid supported metallocene catalyst may be used while dissolved or diluted in a solvent such as pentane, hexane, heptanes, nonane, decane, toluene, benzene, dichloromethane, chlorobenzene, and the like. Wherein, the solvent may be treated with a small amount of alkylaluminum to remove a small amount of water or air that may have an adverse influence on the catalyst.

And, the polyolefin prepared by the above method may exhibit high dart drop impact strength, as well as low density, and excellent transparency.

Specifically, the polyolefin may have density of 0.915 g/cm$^3$ to 0.930 g/cm$^3$, and ethylene sequence inhomogeneity (I) of 1.25 to 1.40, when analyzing by SSA (Successive Self-nucleation and Annealing)

And, the polyolefin may exhibit melt index (MI$_{2.16}$) measured under temperature of 190° C. and load of 2.16 kg according to ASTM D1238, of 0.5 to 1.5 g/10 min.

And, the polyolefin may exhibit haze of a film of 11% or less, measured according to ISO 13468, after preparing a polyolefin film (BUR 2.3, film thickness of 55 to 65 μm) using a film applicator.

And, the polyolefin may exhibit dart drop impact strength of 850 g or more, measured according to ASTM D 1709 [Method A], after preparing a polyolefin film (BUR 2.3, film thickness of 55 to 65 μm) using a film applicator.

And, in case the polyolefin is, for example, ethylene-alpha olefin copolymer, preferably copolymer of ethylene and 1-butene, or copolymer of ethylene and 1-hexene, the above properties may be more appropriately fulfilled.

Hereinafter, preferable examples are presented for better understanding of the invention. However, these examples are presented only as the illustrations of the invention and the scope of the present invention is not limited thereby.

EXAMPLE

Synthesis Example of a Metallocene Compound

Synthesis Example 1: A First Metallocene Compound 1-1 Preparation of a Ligand Compound Tetramethylcyclopentadiene (TMCP) was lithiated with n-BuLi (1 equivalent) in THF (0.4 M), and then, filtered and used as tetramethylcyclopentyl-Li salts (TMCP-Li salts). Indene was lithiated with n-BuLi (1 equivalent) in hexane (0.5 M), and then, filtered and used as indene-Li salts (Ind-Li salts). Into a 250 mL Schlenk flask, 50 mmol of tetramethylcyclopentyl-Li salts (TMCP-Li salts) and 100 mL of tetrahydrofurane (THF) were introduced under Ar. 1 equivalent of dichloromethyl-(iso-propyl) silane was added at −20° C. After about 6 hours, 3 mol % of CuCN and Ind-Li salts (50 mmol, MTBE 1M solution) were added at −20° C., and reacted for about 12 hours. An organic layer was separated with water and hexane to obtain ligand.

1-2 Preparation of a Metallocene Compound

Into a dried 250 mL Schlenk flask, 50 mmol of the ligand compound synthesized in 1-1 was introduced and dissolved in about 100 mL of MTBE under Ar, and 2 equivalents of n-BuLi was added dropwise at −20° C. After reaction for about 16 hours, the ligand-Li solution was added to ZrCl$_4$ (THF)$_2$ (50 mmol, MTBE 1 M solution). After reaction for about 16 hours, the solvent was removed, the reaction mixture was dissolved in methylenechloride (MC) and filtered to remove LiCl. The solvent of filtrate was removed, about 50 mL of MTBE and about 100 mL of hexane were added, and the solution was stirred for about 2 hours, and then, filtered to obtain a solid metallocene catalyst precursor.

Into a high pressure stainless steel (sus) reactor, the obtained metallocene catalyst precursor (20 mmol), 60 mL of DCM, and 5 mol % of Pd/C catalyst were introduced under argon atmosphere. Argon inside of the high pressure reactor was replaced with hydrogen three times, and hydrogen was filled such that pressure became about 20 bar. By stirring at 35° C. for about 24 hours, the reaction was completed. The inside of the reactor was replaced with argon, and then, the DCM solution was transferred to a schlenk flask under argon atmosphere. The solution was passed through celite under argon to remove the Pd/C catalyst, and the solvent was dried to obtain a solid catalyst precursor.

$^1$H NMR (500 MHz, C6D6): 0.62 (3H, s), 0.98 (3H, d), 1.02 (3H, d), 1.16 (2H, dd), 1.32-1.39 (3H, m), 1.78 (3H, s), 1.81 (3H, s), 1.84-1.94 (3H, m), 2.01 (3H, s), 2.03 (1H, m), 2.04 (3H, s), 2.35 (2H, m), 2.49-2.55 (1H, m), 3.13-3.19 (1H, m), 5.27 (1H, d), 6.75 (1H, d).

Synthesis Example 2: A First Metallocene Compound 2-1 Preparation of a Ligand Compound Tetramethylcyclopentadiene (TMCP) was lithiated with n-BuLi (1 equivalent) in THF (0.4 M), and then, filtered and used as tetramethylcyclopentyl-Li salts (TMCP-Li salts). Indene was lithiated with n-BuLi (1 equivalent) in hexane (0.5 M), and then, filtered and used as indene-Li salts (Ind-Li salts). Into a 250 mL Schlenk flask, 50 mmol of tetramethylcyclopentyl-Li salts (TMCP-Li salts) and 100 mL of tetrahydrofurane (THF) were introduced under Ar. 1 equivalent of dichloromethylphenyl silane was added at −20° C. After about 6 hours, 3 mol % of CuCN and Ind-Li salts (50 mmol, MTBE 1M solution) were added at −20° C., and reacted for about 12 hours. An organic layer was separated with water and hexane to obtain ligand.

2-2 Preparation of a Metallocene Compound

Into a dried 250 mL Schlenk flask, 50 mmol of the ligand compound synthesized in 2-1 was introduced and dissolved in about 100 mL of MTBE under Ar, and 2 equivalents of n-BuLi was added dropwise at −20° C. After reaction for about 16 hours, the ligand-Li solution was added to ZrCl$_4$ (THF)$_2$ (50 mmol, MTBE 1 M solution). After reaction for about 16 hours, the solvent was removed, the reaction mixture was dissolved in methylenechloride (MC) and filtered to remove LiCl. The solvent of filtrate was removed, about 50 mL of MTBE and about 100 mL of hexane were added, and the solution was stirred for about 2 hours, and then, filtered to obtain a solid metallocene catalyst precursor.

Into a high pressure stainless steel (sus) reactor, the obtained metallocene catalyst precursor (20 mmol), 60 mL of DCM, and 5 mol % of Pd/C catalyst were introduced under argon atmosphere. Argon inside of the high pressure reactor was replaced with hydrogen three times, and hydrogen was filled such that pressure became about 20 bar. By stirring at 35° C. for about 24 hours, the reaction was completed. The inside of the reactor was replaced with argon, and then, the DCM solution was transferred to a schlenk flask under argon atmosphere. The solution was passed through celite under argon to remove the Pd/C catalyst, and the solvent was dried to obtain different steroisomers of metallocene compound (A, B forms) at a ratio of 1.3:1.

$^1$H NMR (500 MHz, CDCl$_3$):

Form A: 0.88 (3H, s), 1.43-1.50 (1H, m), 1.52-1.57 (1H, m), 1.60 (3H, s), 1.62-1.68 (1H, m), 1.87-1.95 (1H, m), 1.95-2.00 (1H, m), 2.00 (3H, s), 2.06 (3H, s), 2.08 (3H, s), 2.41-2.47 (1H, m), 2.72-2.78 (1H, m), 3.04-3.10 (1H, m), 5.62 (1H, d), 6.73 (1H, d), 7.49 (3H, m), 7.87 (2H, m)

Form B: 0.99 (3H, s), 1.42 (3H, s), 1.60-1.67 (2H, m), 1.90-1.98 (1H, m), 1.95 (3H, s), 2.06 (3H, s), 2.06-2.10 (1H, m), 2.11 (3H, s), 2.44-2.49 (1H, m), 2.66-2.70 (1H, m), 2.74-2.79 (1H, m), 3.02-3.11 (1H, m), 5.53 (1H, d), 6.74 (1H, d), 7.48 (3H, m), 7.88 (2H, m).

Synthesis Example 3: A First Metallocene Compound 3-1 Preparation of a Ligand Compound In a dried 250 mL schlenk flask, tetramethylcyclopentadiene (TMCP, 6.0 mL, 40 mmol) was dissolved in THF (60 mL), and then, the solution was cooled to −78° C. Subsequently, n-BuLi (2.5M, 17 mL, 42 mmol) was slowly added dropwise to the solution, and then, the obtained solution was stirred at room temperature overnight.

Meanwhile, in a separate 250 mL schlenk flask, dichlorodimethylsilane (4.8 mL, 40 mmol) was dissolved in n-hexane, and then, the solution was cooled to −78° C. Subsequently, the TMCP-lithiation solution prepared above was slowly added to the solution. And, the obtained solution was stirred at room temperature overnight.

Thereafter, the obtained solution was decompressed to remove solvents. And, the obtained solid was dissolved in toluene and filtered to remove remaining LiCl, thus obtaining an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

In a dried 250 mL schlenk flask, indene (0.93 mL, 8.0 mmol) was dissolved in THF (30 mL), and then, the solution was cooled to −78° C. Subsequently, n-BuLi (2.5M, 3.4 mL, 8.4 mmol) was slowly added dropwise to the solution, and then, the obtained solution was stirred at room temperature for about 5 hours.

Meanwhile, in a separate 250 mL schlenk flask, the intermediate synthesized above (1.7 g, 8.0 mmol) was dissolved in THF, and the solution was cooled to −78° C. Subsequently, the indene-lithiation solution prepared above was slowly added to the solution. And, the obtained solution was stirred at room temperature overnight to obtain a reddish purple solution.

Thereafter, water was poured into the reactor to finish the reaction (quenching), and an organic layer was extracted with ether from the mixture. It was confirmed through $^1$H NMR that dimethyl(indenyl)(tetramethylcyclopentadienyl) silane and different kinds of organic compounds are included in the organic layer. The organic layer was concentrated without purification and used for metallation.

3-2 Preparation of a Metallocene Compound

Into a 250 mL schlenk flask, dimethyl(indenyl)(tetramethylcyclopentadienyl)silane synthesized above (1.7 g, 5.7 mmol) was dissolved in toluene (30 mL) and MTBE (3.0 mL). And, the solution was cooled to −78° C., n-BuLi (2.5M, 4.8 mL, 12 mmol) was slowly added dropwise to the solution, and the obtained solution was stirred at room temperature overnight. However, yellow solid was produced in the solution and was not uniformly stirred, and thus, MTBE (50 mL) and THF (38 mL) were additionally introduced.

Meanwhile, in a separate 250 mL schlenk flask, ZrCl$_4$ (THF)$_2$ was dispersed in toluene, and the obtained mixture was cooled to −78° C. Subsequently, the lithiated ligand solution prepared above was slowly introduced into the mixture. And, the obtained mixture was stirred overnight.

Thereafter, the reaction product was filtered to obtain yellow solid (1.3 g, containing LiCl (0.48 g), 1.8 mmol), and solvents were removed from the filtrate, followed by washing with n-hexane to additionally obtain yellow solid (320 mg, 0.70 mmol) (total 44% yield).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

The above synthesized dimethylsilylene(tetramethylcyclopentadienyl)(indenyl)zirconium dichloride (1.049 g, 2.3 mmol) was put in a mini bombe in a glove box. And, platinum oxide (52.4 mg, 0.231 mmol) was additionally put in the mini bombe, the mini bombe was assembled, and then, anhydrous THF (30 mL) was introduced into the mini bombe using a cannula, and hydrogen was filled to the pressure of about 30 bar. Subsequently, the mixture contained in the mini bombe was stirred at about 60° C. for about one day, and then, the mini bombe was cooled to room temperature, and while gradually decreasing the pressure of the mini bombe, hydrogen was replaced with argon.

Meanwhile, celite dried in an oven of about 120° C. for about 2 hours was laid in a schlenk filter, and using the same, the reaction product of the mini bombe was filtered under argon. By the celite, the PtO$_2$ catalyst was removed from the reaction product. Subsequently, the catalyst-removed reaction product was decompressed to remove solvents, and a light yellow solid product was obtained (0.601 g, 1.31 mmol, Mw: 458.65 g/mol).

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Synthesis Example 4: A Second Metallocene Compound 4-1 Preparation of a Ligand Compound Into a dried 250 mL schlenk flask, 11.618 g (40 mmol) of 4-(4-(tert-butyl)phenyl)-2-isopropyl-1H-indene was introduced, and 100 mL of THF was introduced under argon. A diethylether solution was cooled to 0° C., and then, 18.4 mL of nBuLi solution (2.5 M, 46 mmol, in hexane) was slowly added dropwise. The temperature of the reaction mixture was slowly raised to room temperature, and then, the mixture was stirred until the next day. In a separate 250 mL schlenk flask, a solution of 12.0586 g (40 mmol, purity 90% calculated) dichloromethyltethersilane and 100 mL hexane was prepared, and the Schlenk flask was cooled to −30° C., and then, the lithiated solution was added dropwise thereto. After finishing the introduction, the temperature of the mixture was slowly raised to room temperature, and then, stirred for a day. Next day, NaCp (2M, in THF 33.6 mL) was slowly added and stirred for a day, and then, 50 mL of water was introduced in the flask to quench, and an organic layer was separated and dried with MgSO$_4$. As the result, 23.511 g (52.9 mmol) of oil was obtained (NMR based purity/wt %=92.97%. Mw=412.69).

4-2 Preparation of a Metallocene Compound

Into a 250 mL schlenk flask dried in an oven, the ligand was introduced and dissolved in 80 mL of toluene and 19 mL of MTBE (160 mmol, 4 equiv.), and then, 2.1 equivalents of nBuLi solution (84 mmol, 33.6 mL) was added to lithiate until the next day. In a glove box, 1 equivalent of ZrCl$_4$ (THF)$_2$ was put in a 250 mL schlenk flask, and ether was introduced to prepare a suspension. Both flasks were cooled to −20° C., and then, ligand anion was slowly added to the Zr suspension. After the introduction was finished, the temperature of the reaction mixture was slowly raised to room temperature. After stirring for a day, MTBE in the mixture was filtered with a Schlenk Filter under argon, and the produced LiCl was removed. The remaining filtrate was removed by vacuum suction, and pentane was added to a small amount of dichloromethane at the volume of reaction solvent. Wherein, the reason why pentane is added is that synthesized catalyst precursor has decreased solubility in pentane and promotes crystallization. The slurry was filtered under argon, and the filter cake remaining on the top and the filtrate were respectively analyzed by NMR to confirm whether or not catalyst was synthesized, and weighed in a glove box and sampled to confirm yield and purity (Mw=715.04).

¹H NMR (500 MHz, CDCl₃): 0.60 (3H, s), 1.01 (2H, m), 1.16 (6H, s), 1.22 (9H, s), 1.35 (4H, m), 1.58 (4H, m), 2.11 (1H, s), 3.29 (2H, m), 5.56 (1H, s), 5.56 (2H, m), 5.66 (2H, m), 7.01 (2H, m), 7.40 (3H, m), 7.98 (2H, m)

Synthesis Example 5: A Second Metallocene Compound 5-1 Preparation of a Ligand Compound 6-tert-butoxyhexyl chloride and sodium cyclopentadiene (2 equivalents) were introduced in THF and stirred. After the reaction was completed, the reaction mixture was worked-up with water and an excessive amount of cylopentadiene was distilled to remove. To 4.45 g (20 mmol) of 6-tert-butoxyhexylcyclopentadiene obtained by the above process, 27 mL of toluene was added. The temperature was lowered to −20° C., 8.8 mL of n-BuLi solution (2.5 M, in hexane, 22 mmol) was added dropwise, and the mixture was stirred at room temperature overnight.

Into a dried 250 mL Schlenk flask, 5.8 g (20 mmol) of 4-(4-(tert-butyl)phenyl)-2-isopropyl-1H-indene was introduced, and 33 mL of MTBE was introduced. The temperature was lowered to −20° C., and 8.8 mL of n-BuLi solution (2.5 M, in hexane, 22 mmol) was added dropwise, and the mixture was stirred at room temperature overnight. The temperature was lowered to −20° C., and 1.5 equivalents of dichlorodimethyl silane was introduced. The reaction mixture was stirred overnight, and distilled to remove an excessive amount of dichlorodimethyl silane.

The lithiated 6-tert-butoxyhexylcyclopentadiene solution was introduced into the flask, and stirred overnight. By workup of the ligand synthesized by the above process, a ligand compound was obtained.

5-2 Preparation of a Metallocene Compound 11.4 g (20 mmol) of the ligand compound synthesized in 5-1 was dissolved in 50 mL of toluene, about 16.8 mL of n-BuLi solution (2.5 M, in hexane, 42 mmol) was added dropwise, and the mixture was stirred overnight. 20 mmol of ZrCl₄(THF)₂ was introduced and stirred overnight, and after the reaction was completed, the reaction mixture was filtered to remove LiCl. All the solvents were removed, followed by crystallization with hexane and purification to obtain different stereoisomers of a metallocene compound (A, B form) at a ratio of 1.3:1.

¹H NMR (500 MHz, C₆D₆):

Form A: 0.58 (3H, s), 0.55 (3H, s), 0.93-0.97 (3H, m), 1.12 (9H, s), 1.28 (9H, s), 1.27 (3H, d), 1.35-1.42 (1H, m), 1.45-1.62 (4H, m), 2.58-2.65 (1H, m), 2.67-2.85 (2H, m), 3.20 (2H, t), 5.42 (1H, m), 5.57 (1H, m), 6.60 (1H, m), 6.97 (1H, dd), 7.27 (1H, d), 7.39-7.45 (4H, m), 8.01 (2H, dd)

Form B: 0.60 (3H, s), 0.57 (3H, s), 0.93-0.97 (3H, m), 1.11 (9H, s), 1.28 (9H, s), 1.32 (3H, d), 1.35-1.42 (1H, m), 1.45-1.62 (4H, m), 2.58-2.65 (1H, m), 2.67-2.85 (2H, m), 3.23 (2H, t), 5.24 (1H, m), 5.67 (1H, m), 6.49 (1H, m), 6.97 (1H, dd), 7.32 (1H, d), 7.39-7.45 (4H, m), 8.01 (2H, dd)

Comparative Synthesis Example 1: A Second Metallocene Compound 1-1 Preparation of a Ligand Compound t-Butyl-O—(CH₂)₆—Cl was prepared using 6-chloro-hexanol by a method described in the document (Tetrahedron Lett. 2951 (1988)), and reacted with NaCp to obtain t-Butyl-O—(CH₂)₆—C₅H₅ (yield 60%, b.p. 80° C./0.1 mmHg).

1-2 Preparation of a Metallocene Compound

And, t-Butyl-O—(CH₂)₆—C₅H₅ was dissolved in THF at −78° C., and n-BuLi was slowly added thereto, and then, the temperature was raised to room temperature, and the mixture was reacted for 8 hours. The synthesized lithium salt solution was slowly added to a suspension of ZrCl₄(THF)₂ (1.70 g, 4.50 mmol)/THF (30 ml) at −78° C., and the solution was further reacted at room temperature for 6 hours.

All the volatiles were vacuum dried, and hexane was added to the obtained oily liquid to filter. The filtered solution was vacuum dried, and then, hexane was added to precipitate at low temperature (−20° C.). The obtained precipitate was filtered at room temperature to obtain a compound [tBu-O—(CH₂)₆—C₅H₄]₂ZrCl₂ in the form of white solid (yield 92%).

¹H NMR (300 MHz, CDCl₃): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

Comparative Synthesis Example 2: A Second Metallocene Compound 2-1 Preparation of a Ligand Compound Into a dried 250 mL Schlenk flask, 3.7 g (40 mmol) of 1-chlorobutane was introduced, and dissolved in 40 mL of THF. 20 mL of sodium cyclopentadienylide THF solution was slowly added thereto, and then, the mixture was stirred overnight. To the reaction mixture, 50 mL of water was added to quench, it was extracted with ether (50 mL×3), and then, the collected organic layer was sufficiently washed with brine. Remaining moisture was dried with $MgSO_4$ and filtered, and then, the solvents were removed by vacuum suction, thus obtaining a dark brown viscous product 2-butyl-cyclopenta-1,3-diene with quantitative yield.

2-2 Preparation of a Metallocene Compound

Into a dried 250 mL Schlenk flask, about 4.3 g (23 mmol) of the ligand compound synthesized in 2-1 was introduced, and dissolved in about 60 mL of THF. About 11 mL of n-BuLi solution (2.0M, in hexane, 28 mmol) was added thereto, the mixture was stirred overnight, and then, the solution was slowly added to a flask containing 3.83 g (10.3 mmol) of $ZrCl_4(THF)_2$ dispersed in about 50 mL of ether, at −78° C.

Upon raising the temperature of the reaction mixture to room temperature, light brown suspension turned into cloudy yellow suspension. After stirring overnight, all the solvents were dried, about 200 mL of hexane was added to sonicate and sink, and then, the hexane solution floating on the upper layer was decanted with a cannula and collected. This process was repeated twice to obtain a hexane solution, which was dried by vacuum suction, and it was confirmed that a compound bis(3-butyl-2,4-dien-yl) zirconium(IV) chloride in the form of light yellow solid was produced.

$^1$H NMR (500 MHz, $CDCl_3$): 0.91 (6H, m), 1.33 (4H, m), 1.53 (4H, m), 2.63 (4H, t), 6.01 (1H, s), 6.02 (1H, s), 6.10 (2H, s), 6.28 (2H, s)

Preparation Example of a Hybrid Supported Metallocene Catalyst

Preparation Example 1

Into a 20 L SUS high pressure reactor, 2.0 kg of toluene and 1000 g of silica (Grace Davison, SP2410) were introduced, and stirred while raising the temperature of the reactor to 40° C. Into the reactor, 5.4 kg of methylaluminoxane (10 wt % in toluene, manufactured by Albemarle Company) was introduced, the temperature was raised to 70° C., and then, the mixture was stirred at about 200 rpm for about 12 hours. Thereafter, the temperature of the reactor was lowered to 40° C., and stirring was stopped. And, the reaction product was left for about 10 minutes, and then, decanted. Again, 2.0 kg of toluene was added to the reaction product, the mixture was stirred for about 10 minutes, stirring was stopped, and the mixture was left for about 30 minutes, and then, decanted.

Into the reactor, 2.0 kg of toluene was introduced, and subsequently, the compound prepared in Synthesis Example 1 (60 mmol), the compound prepared in Synthesis Example 4 (10 mmol) and 1000 mL of toluene were introduced. The temperature of the reactor was raised to 85° C., and the reaction mixture was stirred for about 90 minutes.

Thereafter, the reactor was cooled to a room temperature, stirring was stopped, and the reaction product was left for about 30 minutes, and then, decanted. Subsequently, 3 kg of hexane was introduced into the reactor, the hexane slurry solution was transferred to a 20 L filter dryer and filtered, and vacuum dried at 50° C. for about 4 hours to obtain 1.5 kg of a supported catalyst.

Preparation Example 2

A hybrid supported metallocene catalyst was prepared by the same method as Preparation Example 1, except that the metallocene compounds of Synthesis Example 2 (60 mmol) and Synthesis Example 4 (10 mmol) were used.

Preparation Example 3

A hybrid supported metallocene catalyst was prepared by the same method as Preparation Example 1, except that the metallocene compounds of Synthesis Example 3 (60 mmol) and Synthesis Example 5 (10 mmol) were used.

Comparative Preparation Example 1

A hybrid supported metallocene catalyst was prepared by the same method as Preparation Example 1, except that only the metallocene compounds of Synthesis Example 1 (70 mmol) was used.

Comparative Preparation Example 2

A hybrid supported metallocene catalyst was prepared by the same method as Preparation Example 1, except that the metallocene compounds of Synthesis Example 3 (60 mmol) and Comparative Synthesis Example 1 (10 mmol) were used.

Comparative Preparation Example 3

A hybrid supported metallocene catalyst was prepared by the same method as Preparation Example 1, except that the metallocene compounds of Synthesis Example 2 (60 mmol) and Comparative Synthesis Example 2 (10 mmol) were used.

The main constructions of the Preparation Examples and Comparative Preparation Examples were described in the following Table 1.

TABLE 1

|  | Preparation Example 1 | Preparation Example 2 | Preparation Example 3 | Comparative Preparation Example 1 | Comparative Preparation Example 2 | Comparative Preparation Example 3 |
|---|---|---|---|---|---|---|
| Support form | Hybrid supported | Hybrid supported | Hybrid supported | Single supported | Hybrid supported | Hybrid supported |
| Composition of metallocene compound | Synthesis Example 1/ Synthesis Example 4 | Synthesis Example 2/ Synthesis Example 4 | Synthesis Example 3/ Synthesis Example 5 | Synthesis Example 1 | Synthesis Example 1/ Comparative Synthesis Example 1 | Synthesis Example 2/ Comparative Synthesis Example 2 |
| Rate of metallocene compounds (mole ratio) | 6:1 | 6:1 | 6:1 |  | 6:1 | 6:1 |

Preparation Example of Polyolefin

Ethylene-1-hexene Copolymerization

As a polymerization reactor, a 140 L continuous polymerization reactor capable of progressing isobutene slurry loop process and driven at a reaction flow rate of about 7 m/s was prepared. And, into the reactor, reactants required for olefin polymerization as described in Table 2 were continuously introduced.

As a supported catalyst for each olefin polymerization reaction, those prepared in Preparation Examples as described in Table 1 were used, and the supported catalyst was mixed with isobutene slurry and introduced.

The olefin polymerization reaction was conducted at a pressure of about 40 bar and a temperature of about 84° C.

The main conditions of the polymerization reaction are shown in the following Table 2.

maintained for 1 minute, and then, increased again. Next, after heating to a temperature (117° C.) 5° C. lower than the initial heating temperature of 122° C., the temperature was maintained for 20 minutes, decreased to 30° C. and maintained for 1 minute, and then, increased again. In this way, while gradually decreasing the heating temperature at the same maintenance time and cooling temperature with (n+1) th heating temperature being 5° C. lower than nth heating temperature, the above process was repeated until the final heating temperature became 52° C. Wherein, the temperature increase and decrease speeds were respectively controlled to 20° C./min. Finally, while increasing the temperature from 30° C. to 160° C. at a temperature rise speed of 10° C./min, calory change was observed to measure SSA thermogram.

TABLE 2

| Catalyst | Example 1 Preparation Example 1 | Example 2 Preparation Example 2 | Example 3 Preparation Example 3 | Comparative Example 1 Comparative Preparation Example 1 | Comparative Example 2 Comparative Preparation Example 2 | Comparative Example 3 Comparative Preparation Example 3 |
|---|---|---|---|---|---|---|
| Ethylene input (kg/hr) | 40 | 40 | 40 | 40 | 40 | 40 |
| Hydrogen input (ppm) | 15 | 17 | 19 | 22 | 11.5 | 9 |
| Hexene input | 13 | 12.5 | 15 | 16 | 14 | 14.5 |
| Slurry Density (g/L) | 560 | 560 | 563 | 560 | 559 | 558 |
| Activity (kgPE/kgSiO$_2$ · hr) | 6.5 | 5.4 | 5.1 | 4.9 | 6.9 | 6.6 |
| Bulk density(g/mL) | 0.40 | 0.42 | 0.39 | 0.38 | 0.40 | 0.41 |
| Settling efficiency (%) | 40 | 40 | 40 | 40 | 40 | 40 |

Experimental Example

For the polyolefins prepared in Examples and Comparative Examples, the properties were measured as follows, and the results were shown in the following Table 3.

In order to measure haze and dart drop impact strength, the obtained polyolefin was treated with an antioxidant (Irganox 1010+Igafos 168, CIBA Company), and then, granulated at an extrusion temperature of 180~210° C. using twin screw extruder (W&P Twin Screw Extruder, 75 phi, L/D=36).

(1) Density: measured according to ASTM D1505 standard (2) Melt Index (MI$_{2.16}$): measured according to ASTM D1238 (condition E, 190° C., 2.16 kg load) standard.

(3) Haze: Using a single screw extruder (Yoojin Engineering, Single Screw Extruder, Blown Film M/C, 50 phi), inflation molding was conducted at an extrusion temperature of 130~170° C. to the thickness of 60 μm. Wherein, die gap was set as 2.0 mm, and blown-up ratio was set as 2.3. The prepared film was measured according to ISO 13468 standard. Wherein, one specimen was measured 10 times and the average value was taken.

(4) Dart drop impact strength: A polymer film was prepared under the same conditions as (3), and then, each film sample was measured 20 or more times according to ASTM D1709 [Method A], and the average value was taken.

(5) SSA Thermogram

Using Differential Scanning calorimeter (device name: DSC8000, Manufacturing company: PerkinElmer), polyolefin was initially heated to 160° C., and maintained for 30 minutes, thus removing heat history before measuring the sample.

The temperature was decreased from 160° C. to 122° C. and maintained for 20 minutes, decreased to 30° C. and (6) Ethylene Sequence Inhomogeneity (I)

Ethylene sequence inhomogeneity (I) was calculated according to the following Equation 1:

$$\text{Inhomogeneity } (I) = L_w/L_n \quad \text{[Equation 1]}$$

In the Equation 1, $L_w$ is the weighted average (unit: nm) of ESL (Ethylene sequence length), and $L_n$ is the arithmetic mean (unit: nm) of ESL (Ethylene sequence length).

The weighted average $L_w$ and arithmetic mean $L_n$ in the Equation 1 were calculated by the following Equations 2 and 3:

$$L_n = \frac{S_1 L_1^2 + S_2 L_2^2 + S_3 L_3^2 + \ldots + S_i L_i^2}{S_1 + S_2 + S_3 + \ldots + S_i} = \sum f_i L_i \quad \text{[Equation 2]}$$

$$L_w = \frac{S_1 L_1^2 + S_2 L_2^2 + S_3 L_3^2 + \ldots + S_i L_i^2}{S_1 L_1 + S_2 L_2 + S_3 L_3 + \ldots + S_i L_i} = \frac{\sum f_i L_i^2}{\sum f_i L_i} \quad \text{[Equation 3]}$$

In the Equations 2 and 3, $S_i$ is the area of each melting peak measured in SSA thermogram, and $L_i$ is the average ethylene sequence length (ASL) corresponding to each melting peak in SSA thermogram.

And, the ASL was calculated from the above measured SSA thermogram, referring to Journal of Polymer Science Part B: Polymer Physics. 2002, vol. 40, 813-821 and Journal of the Korean Chemical Society 2011, Vol. 55, No. 4.

Figure 1:
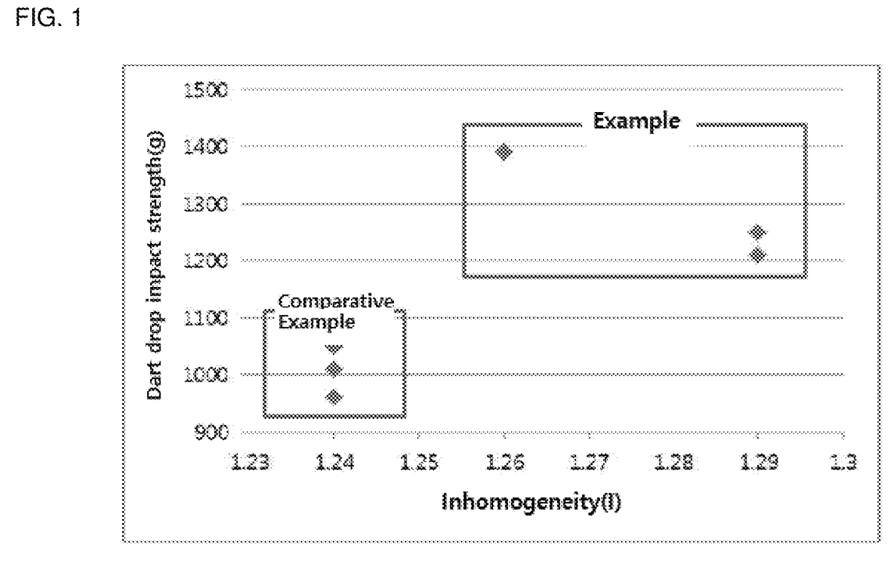
FIG. 1 is a graph showing the relation between the inhomogeneity and dart drop impact strength of polyolefin according to Examples and Comparative Examples.

A graph showing the relationship between the inhomogeneity and dart drop impact strength of polyolefin according to Examples and Comparative Examples and SCB content was shown in FIG. 1.

TABLE 3

| | Example 1 | Example 2 | Example 3 | Comparative Example 1 | Comparative Example 2 | Comparative Example 3 |
|---|---|---|---|---|---|---|
| Density (g/cm$^3$) | 0.918 | 0.918 | 0.917 | 0.918 | 0.918 | 0.918 |
| MI$_{2.16}$(g/10 min) | 0.96 | 1.09 | 0.99 | 1.23 | 1.03 | 1.13 |
| L$_n$ (nm) | 10.54 | 13.27 | 11.46 | 10.48 | 10.34 | 10.62 |
| L$_w$ (nm) | 11.18 | 14.45 | 14.77 | 12.697 | 12.81 | 13.19 |
| I (L$_w$/L$_n$) | 1.26 | 1.29 | 1.29 | 1.24 | 1.24 | 1.24 |
| Dart drop impact strength (g) | 1,390 | 1,250 | 1,210 | 960 | 1,050 | 1,010 |
| Haze (%) | 8.5 | 9.1 | 10.9 | 9.4 | 12.2 | 11.6 |

Referring to Table 3 and FIG. 1, the polyolefins of Examples 1 to 3 of the present invention exhibit haze of 11% or less, and remarkably excellent dart drop impact strength, compared to Comparative Examples 1 to 3 having the same density.

What is claimed is:

1. A polyolefin having a density of 0.915 g/cm$^3$ to 0.920 g/cm$^3$ measured according to ASTM D1505; and
an ethylene sequence inhomogeneity (I) calculated by Equation 1 of 1.26 to 1.29, when analyzed by a Successive Self-nucleation and Annealing (SSA) thermogram:

$$\text{Inhomogeneity } (I) = L_w / L_n \quad \text{[Equation 1]}$$

in Equation 1,
the L$_n$ is calculated by Equation 2, and the L$_w$ is calculated by Equation 3:

$$L_n = \frac{S_1 L_1^2 + S_2 L_2^2 + S_3 L_3^2 + \ldots + S_i L_i^2}{S_1 + S_2 + S_3 + \ldots + S_i} = \sum f_i L_i \quad \text{[Equation 2]}$$

$$L_w = \frac{S_1 L_1^2 + S_2 L_2^2 + S_3 L_3^2 + \ldots + S_i L_i^2}{S_1 L_1 + S_2 L_2 + S_3 L_3 + \ldots + S_i L_i} = \frac{\sum f_i L_i^2}{\sum f_i L_i} \quad \text{[Equation 3]}$$

in Equations 2 and 3,
S$_i$ is an area of a melting peak measured by the SSA thermogram, and
L$_i$ is an average ethylene sequence length corresponding to the melting peak in the SSA thermogram,
wherein the SSA thermogram is obtained by heating the polyolefin to a first heating temperature of 120 to 124° C. using differential scanning calorimetry, maintaining for 15 to 30 minutes for annealing, and then cooling to 28 to 32° C. for quenching; and while gradually decreasing a subsequent heating temperature by stages with (n+1)th heating temperature being 3 to 7° C. lower than nth heating temperature, repeating the heating, the annealing and the quenching until a final heating temperature becomes 50 to 54° C., and
which has a haze measured according to ISO 13468, of 11% or less, by a polyolefin film having a thickness of 55 to 65 μm, prepared from the polyolefin using a single screw extruder at an extrusion temperature of 130~170° C., a die gap of 2.0 mm, and a blown-up ratio of 2.3, and
a dart drop impact strength measured according to ASTM D 1709 [Method A], of 1210 g or more, by a polyolefin film having a thickness of 55 to 65 μm, prepared from the polyolefin using a single screw extruder at an extrusion temperature of 130~170° C., a die gap of 2.0 mm, and a blown-up ratio of 2.3.

2. The polyolefin according to claim 1, which has a melt index (MI$_{2.16}$) measured under load of 2.16 kg at a temperature of 190° C. according to ASTM D1238 of 0.5 to 1.5 g/10 min.

3. The polyolefin according to claim 1, wherein the polyolefin is copolymer of ethylene and alpha olefin.

4. The polyolefin according to claim 3, wherein the alpha olefin includes one or more of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methyl styrene, divinylbenzene, or 3-chloromethyl styrene.

5. The polyolefin according to claim 1, wherein the polyolefin is prepared by polymerizing olefin monomers, in the presence of a hybrid supported metallocene catalyst comprising a first metallocene compound selected from a compound represented by Chemical Formula 1; a second metallocene compound selected from a compound represented by Chemical Formula 2; and a carrier supporting the first and second metallocene compounds:

[Chemical Formula 1]

in Chemical Formula 1,
Q$_1$ and Q$_2$ are identical to or different from each other, and each independently, halogen, a C1-C20 alkyl group, a C2-C20 alkenyl group, a C2-C20 alkoxyalkyl group, a C6-C20 aryl group, a C7-C20 alkylaryl group, or a C7-C20 arylalkyl group;
T$_1$ is carbon, silicon or germanium;
M$_1$ is a Group 4 transition metal;
X$_1$ and X$_2$ are identical to or different from each other, and each independently, halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group; and $R_1$ to $R_{14}$ are identical to or different from each other, and each independently, hydrogen, halogen, a C1-C20 alkyl group, a C1-C20 haloalkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, or two or more neighboring groups of $R_1$ to $R_{14}$ are connected with each other to form a substituted or unsubstituted aliphatic or aromatic ring;

[Chemical Formula 2]

in Chemical Formula 2, $Q_3$ and $Q_4$ are identical to or different from each other, and each independently, halogen, a C1-C20 alkyl group, a C2-C20 alkenyl group, a C2-C20 alkoxyalkyl group, a C6-C20 aryl group, a C7-C20 alkylaryl group, or a C7-C20 arylalkyl group;

T2 is carbon, silicon or germanium;

M2 is a Group 4 transition metal;

$X_3$ and $X_4$ are identical to or different from each other, and each independently, halogen, a C1-C20 alkyl group, a C2-C20 alkenyl group, a C6-C20 aryl group, a nitro group, an amido group, a C1-C20 alkylsilyl group, a C1-C20 alkoxy group, or a C1-C20 sulfonate group; and

$R_{15}$ to $R_{19}$, $R_{21}$ to $R_{23}$, and $R_{25}$ to $R_{28}$ are identical to or different from each other, and each independently, hydrogen, halogen, a C1-C20 alkyl group, a C1-C20 haloalkyl group, a C2-C20 alkenyl group, a C2-C20 alkoxyalkyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, or two or more neighboring groups of $R_{15}$ to $R_{19}$, $R_{21}$ to $R_{23}$, and $R_{25}$ to $R_{28}$ are connected with each other to form a substituted or unsubstituted aliphatic or aromatic ring, and $R_{20}$ and $R_{24}$ are identical to or different from each other, and each independently a C1 to C20 alkyl group.

6. The polyolefin according to claim 5, wherein the compound represented by Chemical Formula 1 is any one represented by the following Structural Formulas:

7. The polyolefin according to claim 5, wherein the compound represented by Chemical Formula 2 is any one represented by the following Structural Formulas:

8. The polyolefin according to claim 5, wherein a mole ratio of the first and second metallocene compounds is 1:1 to 10:1.

9. The polyolefin according to claim 5, wherein in the Chemical Formula 1, $R_{11}$ to $R_{14}$ are each independently a C1 to C20 alkyl group, $R_1$ is hydrogen or a C1 to C20 alkyl group, $R_2$ to $R_{10}$ are each hydrogen, $Q_1$ and $Q_2$ are each independently a C1 to C20 alkyl group or a C6 to C20 aryl group, $X_1$ and $X_2$ are each independently halogen, and $M_1$ is Ti, Zr or Hf.

10. The polyolefin according to claim 5, wherein in the Chemical Formula 2, $R_{25}$ and $R_{28}$ are each independently hydrogen, a C1 to C20 alkyl group, or a C2 to C20 alkoxyalkyl group, $Q_3$ and $Q_4$ are independently a C1 to C20 alkyl group or a C2 to C20 alkoxyalkyl group, $X_3$ and $X_4$ are each independently halogen, and M2 is Ti, Zr or Hf.

* * * * *